Nov. 2, 1965  F. M. GULLAND  3,214,774

APPARATUS FOR WORKING METAL

Filed June 28, 1963

*INVENTOR.*
FRANK M. GULLAND.
BY
ATTORNEY.

United States Patent Office 3,214,774
Patented Nov. 2, 1965

3,214,774
APPARATUS FOR WORKING METAL
Frank M. Guiland, Syracuse, N.Y., assignor to Carrier Corporation, Syracuse, N.Y., a corporation of Delaware
Filed June 28, 1963, Ser. No. 291,509
3 Claims. (Cl. 10—147)

This invention relates broadly to metalworking. More particularly, this invention relates to apparatus for and a method of forming a groove of a predetermined configuration along the inner surface of a tubular member. The invention includes improved metalworking tool means and an improved method of forming the desired configuration on the internal surface of a tubular member.

In forming a helical groove about the interior surface of a tubular member, problems arise when the pitch of the groove is of a relatively small order, for example, 120 turns per inch. One of the factors contributing to a major problem is the removal of material from the work as the groove is formed. Unless the pieces of metal, detached from the surface of the work, during the formation of the groove are removed, serious damage may result to the formed groove as the metallic particles or chips, as they are more commonly known, are forcibly wedged or jammed into the tube by the action of the tool.

When conventional taps are employed for this purpose, the normal relieved portions spaced between the metalworking teeth very quickly clog with metal particles or chips from the surface of the tube subject to the action of the tool. This invention has for its chief object, the provision of a tool construction of the kind described wherein means are provided for accumulating the particles or pieces formed as the metal is subjected to the tool in such a manner that the pieces do not interfere with the metalworking operation performed by the tool.

An additional object of this invention is the provision of an improved method of forming a helical groove about the interior surface of a tube wherein steps are provided for accumulating and disposing of the pieces of metal stripped from the work by the tool as the helical groove on the interior surface of the tube is formed.

A further object of the invention is the provision of an improved tool construction wherein means are provided for diverting lubricant flow to an area of the tool where chip accumulation is encouraged.

Other objects of the invention will be apparent upon a consideration of the ensuing specification and drawings in which.

Figure 2:
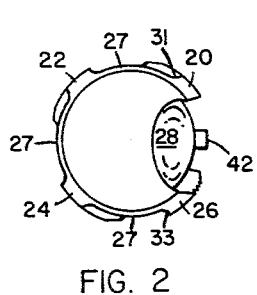
FIGURE 2 is an end view of the tool illustrated in FIGURE 1.
Figure 1:
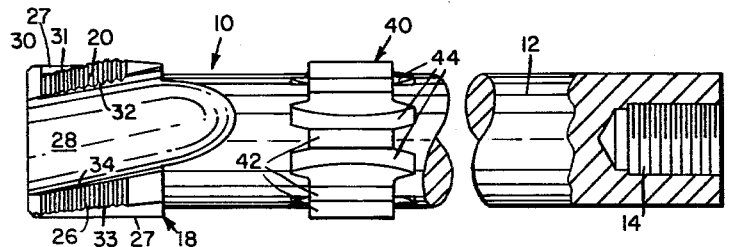
FIGURE 1 is a longitudinal view of a metalworking tool constructed in accordance with the invention.

Referring more particularly to the drawings for an illustration of a preferred embodiment of the invention, there is shown in FIGURE 1 a metalworking tool of the kind employed for the purpose of forming, by cutting, a helical groove about the interior surface of a bore throughout its length. The improved tool forming the subject of this invention is particularly useful in providing the interior surface of a tubular member with a groove having a relatively small pitch.

The tool 10 illustrated in FIGURE 1 includes a shank portion 12 having a recess 14 for attachment to a machine tool or to any instrumentality providing movement to the tool. At the end of the tool remote from recess 14 there is provided an enlarged metalworking section 18. Disposed about the periphery of section 18 are rows 20, 22, 24 and 26 of metal engaging teeth. Between the rows 20 and 22, 22 and 24, and 24 and 26, the tool is relieved as at 27 for a purpose to be later described.

Interposed between row 20 and row 26 is a groove 28. The axis of the groove is inclined relative to the central axis of shank 12 and the groove is of a varying depth so that the outer or upper extremities intersect the rows 20 and 26 of metalworking teeth in the manner illustrated in FIGURE 1. The edges 32 and 34 formed at the juncture of the teeth and the outer limits of the recess or groove 28 define the part of the teeth that first engage the inernal surface of the tube member T, which surface is to be formed with a helical groove.

In addition to the configuration described, there is a central portion 40 of the tool provided with a series of circumferentially spaced projections 42, the outer radial limit of which defines a circle of substantially the same diameter as the inner diameter of the tube. Thus the projections serve as pilots during the movement of the tool through the work. In addition, the grooves 44 between the projections serve as passages for the flow of lubricant in a manner to be later described.

With the construction described, the cutting action between the tool and the internal surface of the tube is limited to either row 20 or row 26 depending upon the direction of rotation of the parts. In the embodiment illustrated, row 26 accomplishes the cutting and a left-hand thread will obtain. If a right-hand thread should be desired, the inclination of the groove 28 would be changed and row 20 would accomplish the cutting. Rows 22 and 24 serve as centering pilots. The relieved sections 27 are provided in order that undesirable binding between the tool and the tube, such as might occur when a slightly undersized tube is encountered, may be avoided. The depth of relief 27 is sufficient to enable the metal of the tube to temporarily "stretch" to a shape other than circular without acquiring a permanent set. At the same time, it is necessary that the depth be maintained at a minimum so that escape of coolant through the passages formed by the relief in turn, is held to a minimum. It has been found that preferably the depth of the relief should be on the order of .002" below the root diameter of the teeth in order to accommodate stretch while minimizing coolant flow loss as will be described later.

As long as rows 22 and 24 serve as pilots as they traverse the grooove, it is not necessary to provide sharp edges on the teeth forming the rows. To insure that cutting action is limited to edges 32 or 34 as required by tool usage, all other edges on teeth in rows 22 and 24 as well as the rear edges 31 and 33 of the teeth in rows 26 and 20 are buffed or otherwise provided with a radius. This construction prevents chip formation in the relief areas 27.

Figure 3:
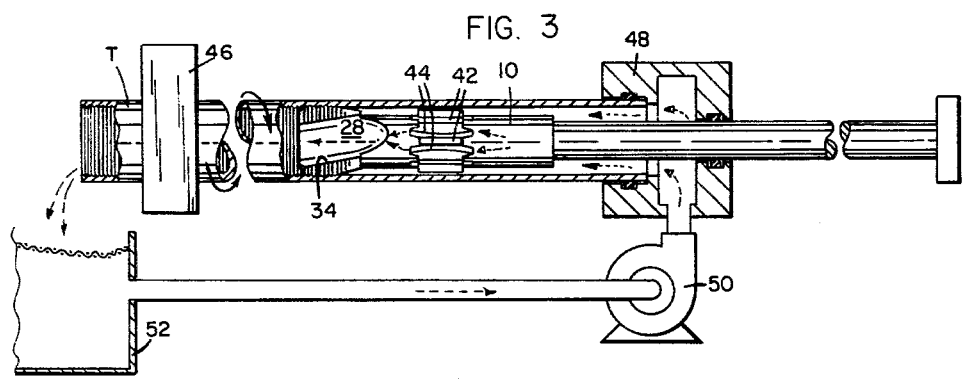
FIGURE 3 is a side view of an arrangement illustrating the improved method of forming a helical groove in accordance with this invention.
Figure 4:
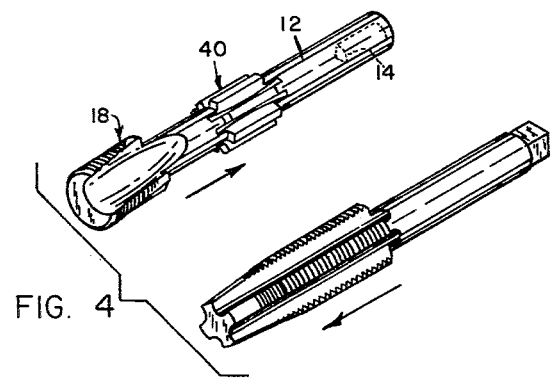
FIGURE 4 is a view illustrating in perspective the improved metalworking tool as it compares with a conventional metalworking tool such as a tap normally employed in operations of the general type to which this invention is directed.

Referring more particularly to FIGURE 3, there is shown an arrangement for practicing the improved method of forming a helical groove about the interior surface of a tubular member. With the construction shown in FIGURE 3, tubular member T is rotated by head member 46. The improved tool 10 acts in the nature of a moving mandrel with the section 18 dimensioned so as to form a helical groove about the inner surface of the tube as the tool moves linearly to the right. Supporting member 48 receives and distributes through the interior of the tube, lubricant delivered by pump 50, the suction of which is in communication with a sump 52. The lubricant flowing through the interior of the tube passes through the passageways 44 and the groove 28 and to a small extent through the passages defined by the relief 27 through the open end of the tube T in communication with sump 52.

With the construction diagrammatically shown in FIGURE 3, the chips or small pieces of metal sheared from the inner surface of the tube by the action of the teeth 20 or 26, depending upon the direction of rotation of the tube T, collect in the groove 28 and are flushed by the action of the lubricant flowing in a direction opposed to the relative direction of movement of the tool as it pertains to the movement of the tube T. The dotted arrows shown on FIGURE 3 indicate the direction of flow of lubricant. The arrow employed in conjunction with FIGURE 1 illustrates the movement of the tool as it relates to the tube. With the tool construction described, relieved portions 27 cause the rows of teeth 22 and 24 to act as pilots, as mentioned above, rather than work accomplishing teeth. In other words, the actual displacement of metal from the inner flow of the tube is accomplished by either the row of teeth 20 or the row of teeth 26 as described above. The relieved portions 27 are relatively shallow in depth so that flow of lubricant is substantially confined to the path including groove 28. Rotation of the tube as indicated in FIGURE 3, provides a surface 34 inclined downwardly in the direction of lubricant flow, for collection of chips. Should an abnormal accumulation of material in groove 28 restrict the flow of lubricant, pressure will almost instantly rise, causing the obstruction to be swept away. The grooves 44 contribute to the flushing action by imparting to the lubricant velocity as passage through the grooves 44 occurs. Thus the combined action of the grooves 44 and 28 provide efficient metal removing operation enabling a helical groove of small pitch to be formed along the inner wall of the cylinder.

With the construction described, a relatively small pump 50 in terms of discharge pressure may be used. Thus a relatively high rate of flow will ensue enabling more efficient use of lubricant to obtain.

While I have described a preferred embodiment of my invention it will be understood that it is not limited thereto but may be embodied within the scope of the following claims.

I claim:
1. A tool for forming a helical groove about the inner surface of a tubular member comprising an elongated member including a first work engaging portion at one end and a second work engaging portion spaced therefrom, said first work engaging portion including a metal cutting surface having a recess of substantial length and varying depth inclined relative to the longitudinal axis of the member, the deepest part of said recess occurring at the end of the member, said metal cutting surface having spaced rows of teeth arranged so that one of the edges of the inclined recess forms a work cutting edge.

2. The tool described in claim 1 wherein said metal cutting surface includes at least one relatively shallow groove.

3. The tool described in claim 1 wherein said second work engaging portion includes a plurality of work-contacting spaced projections defining therebetween passageways through said portion.

References Cited by the Examiner
UNITED STATES PATENTS

| | | | |
|---|---|---|---|
| 451,890 | 5/91 | Dixon | 10—141 |
| 1,395,198 | 10/21 | McFarlane et al. | 10—141 |
| 2,379,908 | 7/45 | Johnson | 10—141 |
| 2,388,779 | 11/45 | Boehmler | 10—1 |
| 2,616,103 | 11/52 | Stecher | 10—1 |
| 2,836,996 | 6/58 | Bissey | 10—106 |
| 2,975,441 | 3/61 | Falco | 10—141 |
| 3,021,538 | 2/62 | Linley | 10—141 |

FOREIGN PATENTS

| | | |
|---|---|---|
| 557,052 | 11/43 | Great Britain. |

OTHER REFERENCES

Lewis: Article from American Machinist, page 136, February 20, 1950.

ANDREW R. JUHASZ, *Primary Examiner.*